United States Patent [19]

Ciriello et al.

[11] Patent Number: 5,122,179
[45] Date of Patent: Jun. 16, 1992

[54] GLASSWARE MAKING MACHINE

[75] Inventors: Michael P. Ciriello, Prospect; John P. Mungovan, Simsbury; Vaughan Abbott, East Hartland; Richard A. Gorski, West Suffield; Angelo A. Boscolo, Kensington; Marty J. Grant, Hartford, all of Conn.

[73] Assignee: Emhart Glass Machinery Investments Inc., Wilmington, Del.

[21] Appl. No.: 809,703

[22] Filed: Dec. 17, 1991

[51] Int. Cl.⁵ .............................................. C03B 9/40
[52] U.S. Cl. ........................................ 65/158; 65/160; 65/163
[58] Field of Search ........................... 65/158, 160, 163

[56] References Cited

U.S. PATENT DOCUMENTS

| | | | |
|---|---|---|---|
| 4,276,075 | 6/1981 | Olivotto | 65/160 |
| 4,547,211 | 10/1985 | Ananias | 65/163 X |
| 4,615,723 | 10/1986 | Fernandez et al. | 65/163 |
| 4,641,269 | 2/1987 | Japenga et al. | 65/160 X |
| 4,782,449 | 11/1988 | Brinker et al. | 65/163 X |

Primary Examiner—Robert L. Lindsay
Attorney, Agent, or Firm—Spencer T. Smith

[57] ABSTRACT

An H-28 machine is a glassware making machine having a plurality of glass making sections which rotate about a vertical axle. The complete process takes one revolution. Individual section mechanisms are controlled by electronically setable cams on a central timing drum and whenever two mechanisms sequentially occupy the same space in a section, machine speed is determined and the cam settings are checked to make certain that the mechanisms will not interfere.

2 Claims, 4 Drawing Sheets

GLASSWARE MAKING MACHINE

The present invention relates to a glassware forming machine, generally referred to as an H-28 machine, which has a plurality of sections rotating about a vertical central axis. Each section can perform the process steps for making a piece of glassware each complete revolution of the machine.

A gob of molten glass is dropped into a blank mold and then pressed into a parison. The parison is held while the blank mold is lowered out of the way by an air cylinder which takes a fixed period of time to complete this displacement. With the blank mold down, the blow mold which includes two parts movable towards and away from each other is closed around the parison so that the parison can be blown into the finished piece of glassware.

The timing of these functions is controlled by a cylindrical timing drum which has a vertical axis and which supports cams on horizontal timing channels which operate selected valves, switches or mechanisms. Conventionally, with two exceptions later defined, these cams can be repositioned only by stopping the machine, loosening clamps, moving cam segments to new timing positions and re-tightening clamps. The machine is then restarted. Timing cannot be optimized while the machine is forming glassware.

The two exceptions are:
1. Press Head Up/Blank Mold Down
2. Low Blow Air On

Both the above can be repositioned while the machine is forming glassware by an operator manually turning a gear drive operatively connected to each cam assembly.

It is an object of the present invention to simplify this cam setting process.

Other objects and advantages of the present invention will become apparent from the following portion of this specification and from the accompanying drawings which illustrate in accordance with the mandate of the patent statutes a presently preferred embodiment incorporating the principles of the invention.

Figure 1:
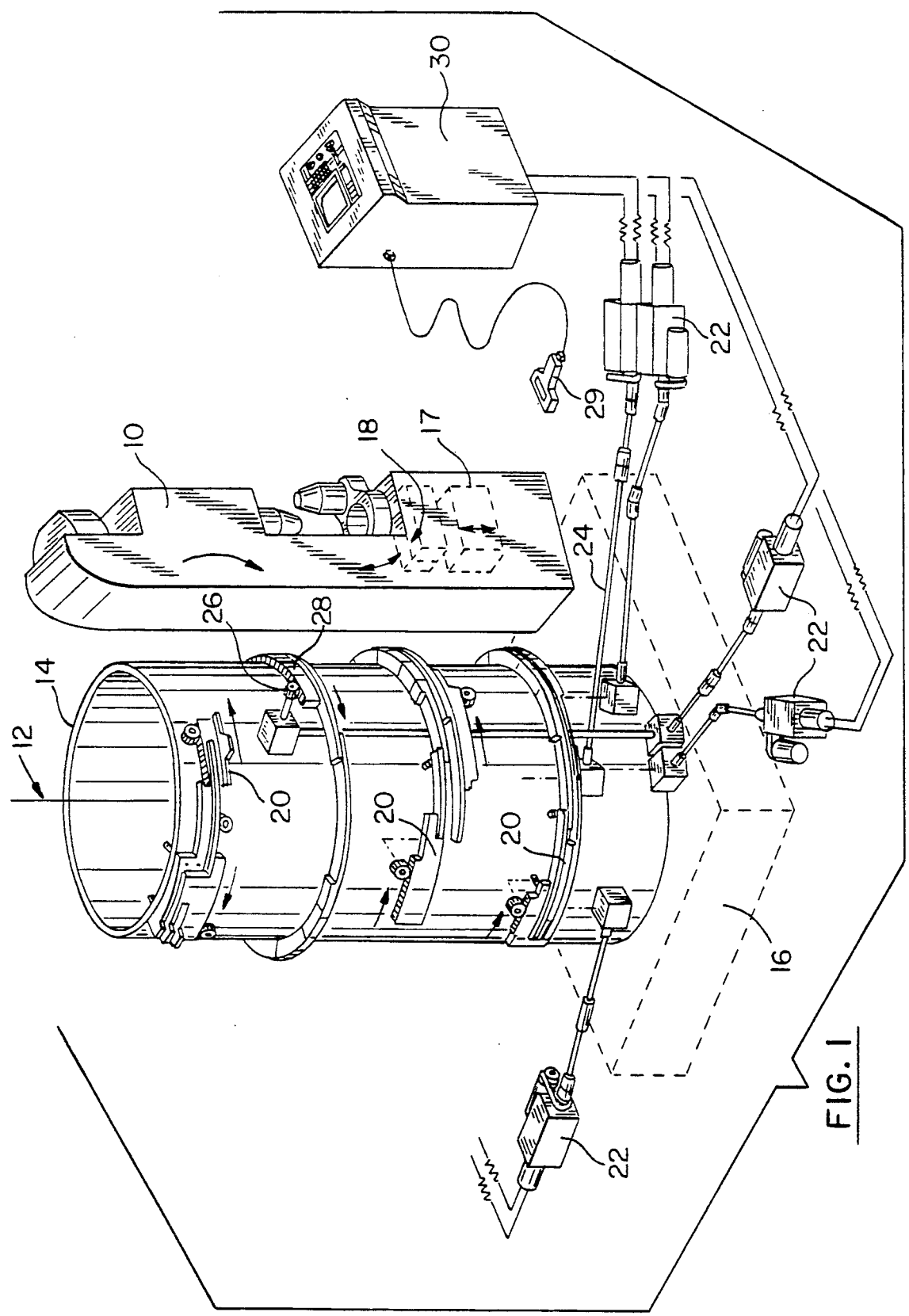
FIG. 1 is an oblique schematic representation of the glass container making machine made in accordance with the teachings of the present invention.

In an H-28 machine, a plurality of sections 10 rotate around the vertical axis 12 of a timing drum 14 which is supported by the machine base 16. Each section makes glassware each revolution. A gob of molten glass is delivered to a blank mold 17 (which is shown schematically in FIG. 1 at its down position). The blank mold then rises to its up position and the gob is pressed in the blank mold to form a parison. The blank mold is lowered to the down position while the parison is held in position and blow molds 18 are displaced to a closed position (schematically shown in FIG. 1) around the parison so that the parison can be blown into the final ware. Some of the operating mechanisms such as the blow mold closing linkage of the blow mold mechanism operate during a fixed angle of rotation of the timing drum while other operating mechanisms such as the pneumatic displacement cylinder of the blank molds operate during a fixed period of time. A change in machine speed will accordingly vary the drum angle during which such a machine speed dependent device operates.

Figure 2:
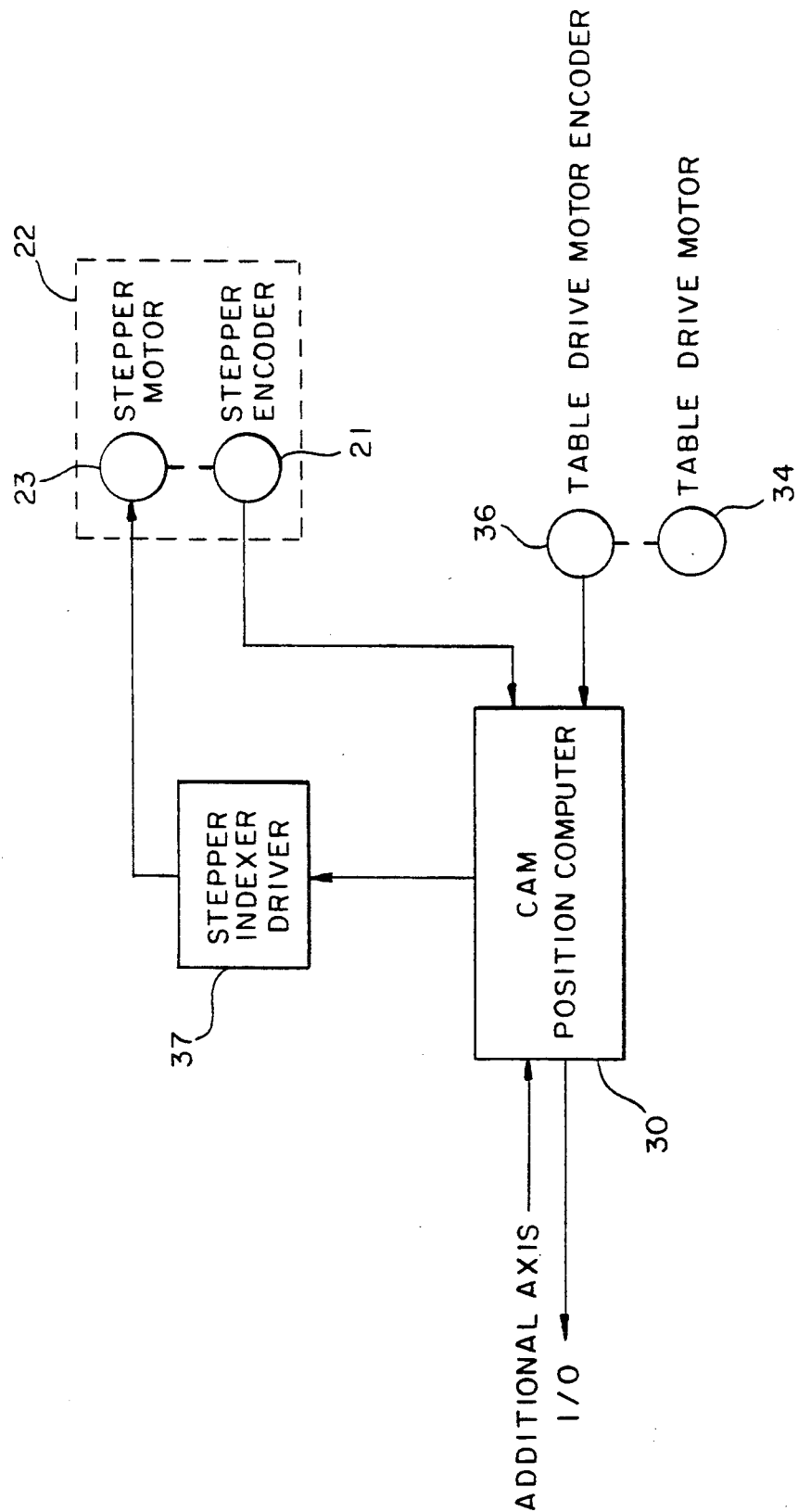
FIG. 2 is a schematic view of the control system for the machine shown in FIG. 1.
Figure 3:
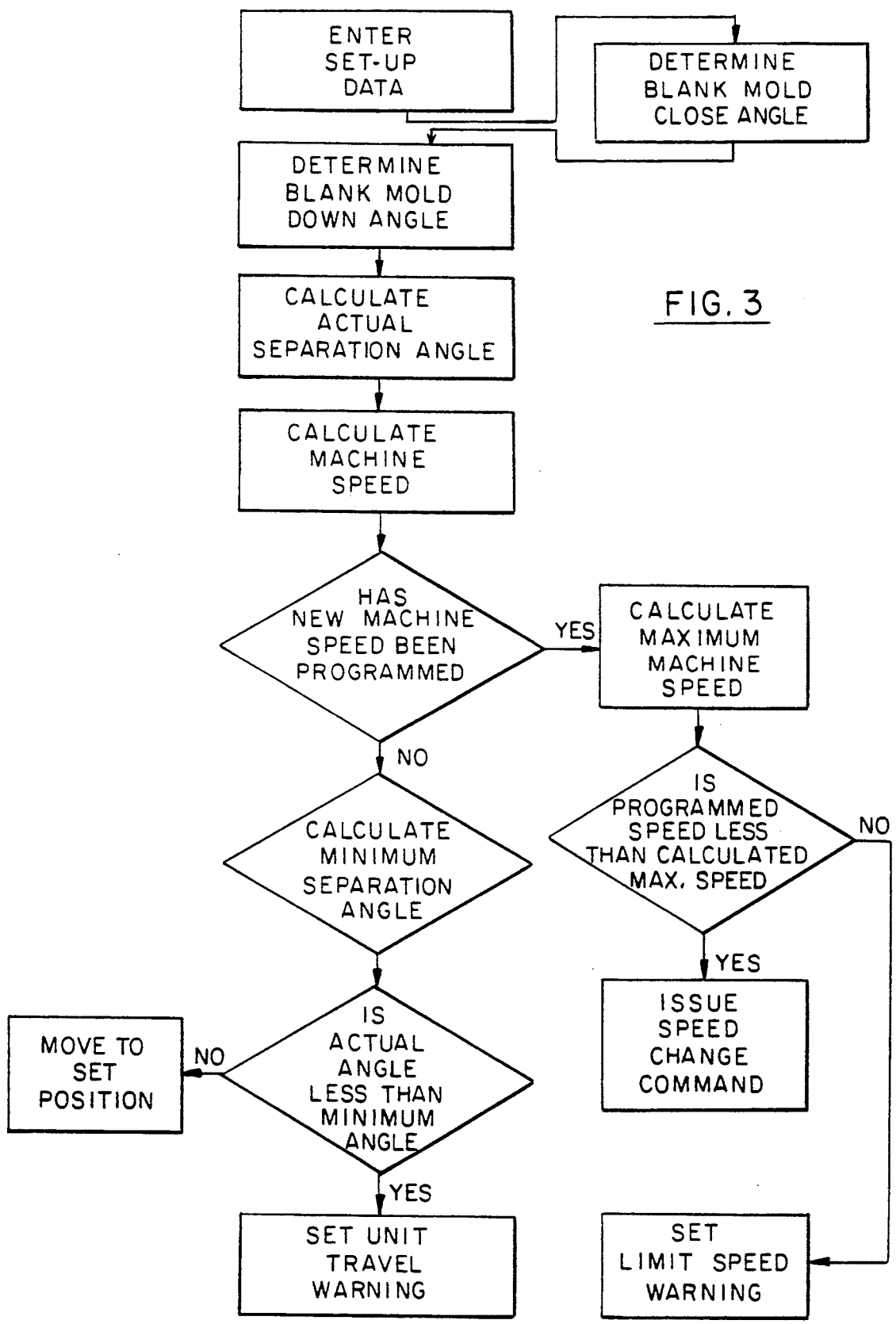
FIG. 3 is a logic diagram for the control system shown in FIG. 2.

The operation of these devices is controlled by mechanical cams 20 which are secured to the drum for limited movement along their annular track and displacement of these cams is effected by driving stepper motors of stepper motor assemblies 22, (FIGS. 1 and 2) which are connected via drive trains 24 ending with a drive pinion 26 to a gear 28 on the associated cam. An operator makes desired changes via a hand held terminal 29 or from the console which is connected to a computer 30. The stepper motor assembly 22 includes the stepper motor 23 and encoder 21 for supplying positional data to the computer.

Figure 4:
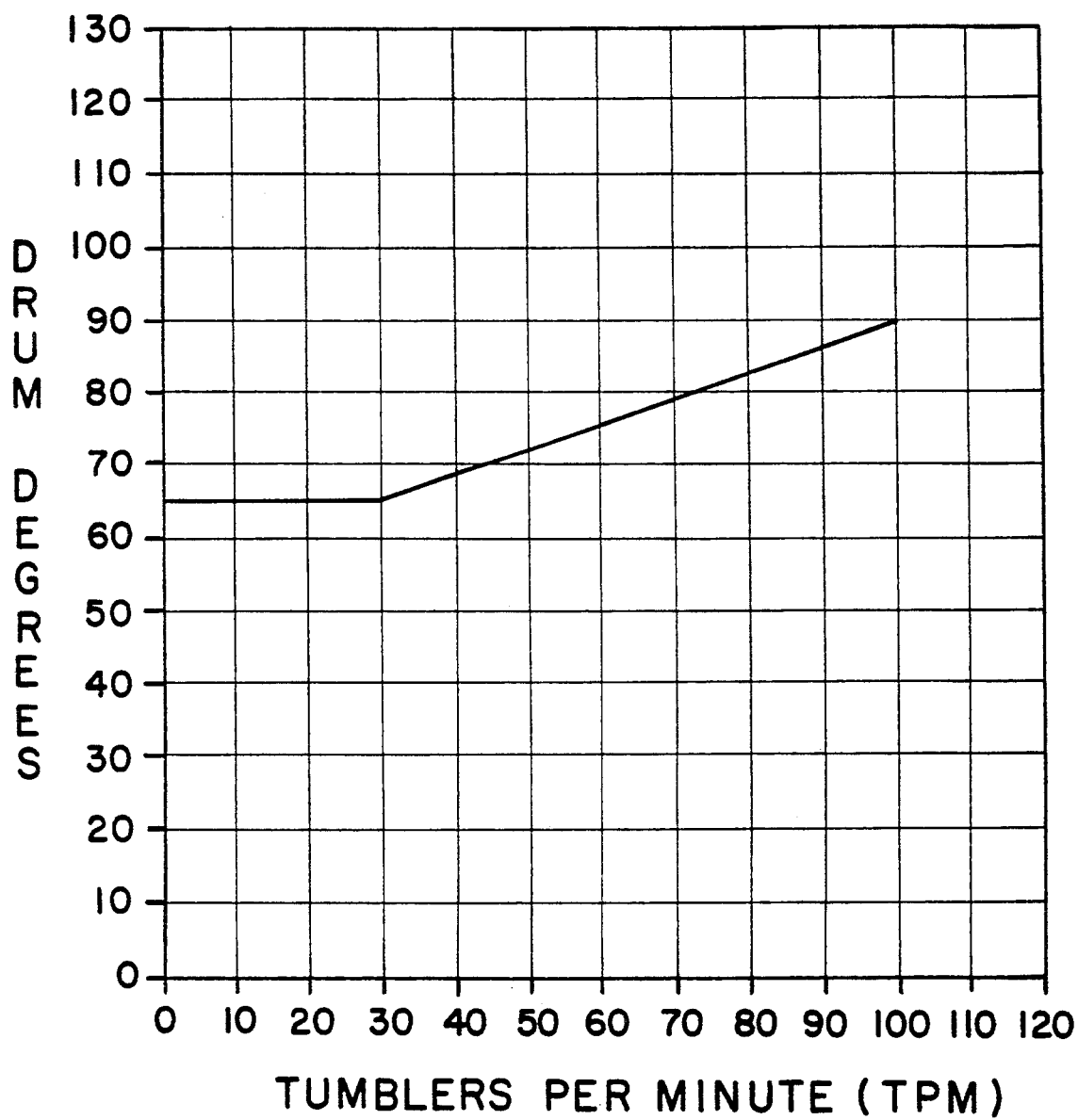
FIG. 4 is a graph showing the relationship between machine speed and the angular separation between the start times of two machine mechanisms which can interfere with each other.

The plurality of sections 10 are supported on a table (not shown) and the table is rotatably driven by a table drive motor 34 (FIG. 2) through appropriate gearing. To supply the table position data to the computer, a feed back device such as a pulse generator driven by a proximity sensor that counts the number of gear teeth which rotates the table, or a table drive motor encoder 36. Either supplies position data to the computer which then computes the speed of the machine and will output move commands to the stepper indexer driver or will inhibit these move commands if interference is determined.

Where two of the machine mechanisms (for example, the blank mold and the blow mold) can occupy the same space and are supposed to sequentially occupy this space without striking the other mechanism, the present machine will prevent such interference. The computer determines the angle of the blank mold down cam and the angle of the blow mold closed cam and calculates the angle of separation. Since the blank mold down mechanism has a fixed time duration whereas the blow mold closed mechanism has a fixed angle duration, a change in machine speed may result in the establishment of an interference between these mechanisms. FIG. 4 represents the relationship between the minimum angle of separation of these two cams and machine speed to avoid interference. Based on this relationship, the computer calculates the machine speed and hence the minimum separation angle and compares this minimum angle with the selected angle and rejects this selected value if the actual separation is less than the minimum allowable separation. An error message will be displayed as well as the correct cam angle allowable.

Conversely, if the operator wants to change to a new machine speed without changing the cam angle settings, the computer will calculate the machine speed possible using the existing cam settings. It will then compare the new machine speed to the calculated machine speed. If interference is not found then the computer will output a speed change command to the table drum motor.

If interference is found then the new machine speed will be rejected and an error message will be displayed as well as the correct machine speed allowable.

Where both mechanisms operate during fixed angular movements, interference will not be a function of machine speed and the minimum angle of separation will be a constant independent of machine speed.

We claim:

1. A glassware forming machine comprising
a plurality of individual sections supported for rotation about a vertical axis, each of said sections including first and second mechanisms which sequentially occupy the same space, first actuator means operable to displace said first mechanism out of said space and second actuator means operable to subsequently displace said second mechanism into said space,
a timing drum located centrally of said individual sections and including first and second control cams on discrete horizontal annular tracks,
means for varying the location of each of said control cams along its track
means for determining the angle of said first control cam,
means for determining the angle of said second control cam,
means for determining the speed of said machine,
means for calculating the minimum angle between said first and second control cams for the machine operating at said speed to avoid interference and,
means for inhibiting angle changes if the separation between the first and second control cams is less than said calculated minimum angle of separation for a given machine speed.

2. A glassware forming machine according to claim 1, further comprising means for changing the speed of the machine and wherein said inhibiting means further comprises means for inhibiting a machine speed change if the separation angle of the first and second control cams is less than said calculated minimum angle of separation for the desired speed change.

* * * * *